United States Patent [19]

Formia et al.

[11] 4,436,066

[45] Mar. 13, 1984

[54] CYLINDER HEAD FOR COMPRESSION-IGNITION INTERNAL COMBUSTION ENGINE

[75] Inventors: Antonio Formia, Turin; Giorgio Filtri, Moncalieri, both of Italy

[73] Assignee: Fiat Veicoli Industriali S.p.A., Turin, Italy

[21] Appl. No.: 110,735

[22] Filed: Jan. 9, 1980

[30] Foreign Application Priority Data

May 23, 1979 [IT] Italy .............................. 68097 A/79

[51] Int. Cl.³ ................................................ F02F 1/24
[52] U.S. Cl. ........................ 123/193 H; 123/41.82 R
[58] Field of Search ........ 123/193 R, 193 H, 193 CH, 123/41.82 R, 41.82 A, 41.72, 41.74

[56] References Cited

U.S. PATENT DOCUMENTS

| | | | |
|---|---|---|---|
| 1,744,184 | 1/1930 | Wahlberg | 123/193 R |
| 2,013,627 | 9/1935 | Fahlman | 123/41.82 |
| 3,087,473 | 4/1963 | Thompson et al. | 123/41.82 |
| 3,420,215 | 1/1969 | Seifert | 123/41.82 |
| 3,942,487 | 3/1976 | Zink | 123/41.74 |

FOREIGN PATENT DOCUMENTS 2354798  5/1975  Fed. Rep. of Germany ...... 123/193 CH

*Primary Examiner*—Craig R. Feinberg
*Attorney, Agent, or Firm*—Sughrue, Mion, Zinn, Macpeak and Seas

[57] ABSTRACT

An aluminium cylinder head for a compression-ignition internal combustion engine is formed with precombustion chambers and a cooling chamber. The cooling chamber is delimited in part by the walls of the precombustion chambers and by a base wall the outer surface of which faces into the cylinders of the engine when the head is assembled onto the engine cylinder block. To allow for expansion of the base wall during engine operation, said base wall is provided with transverse slits intermediate the portions of the head corresponding to the engine cylinders.

6 Claims, 10 Drawing Figures

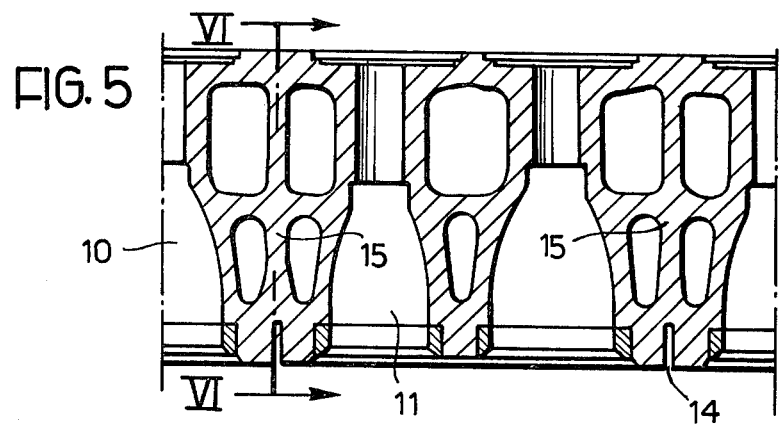
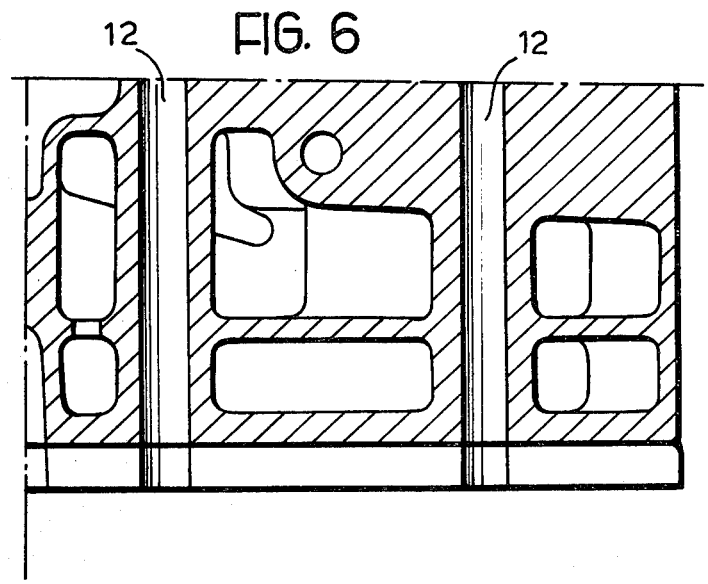
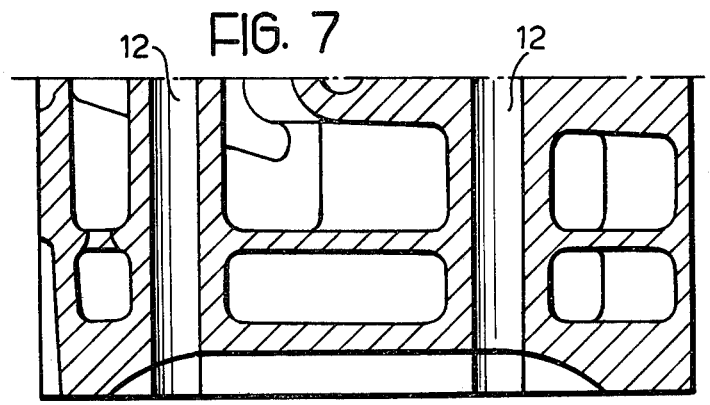

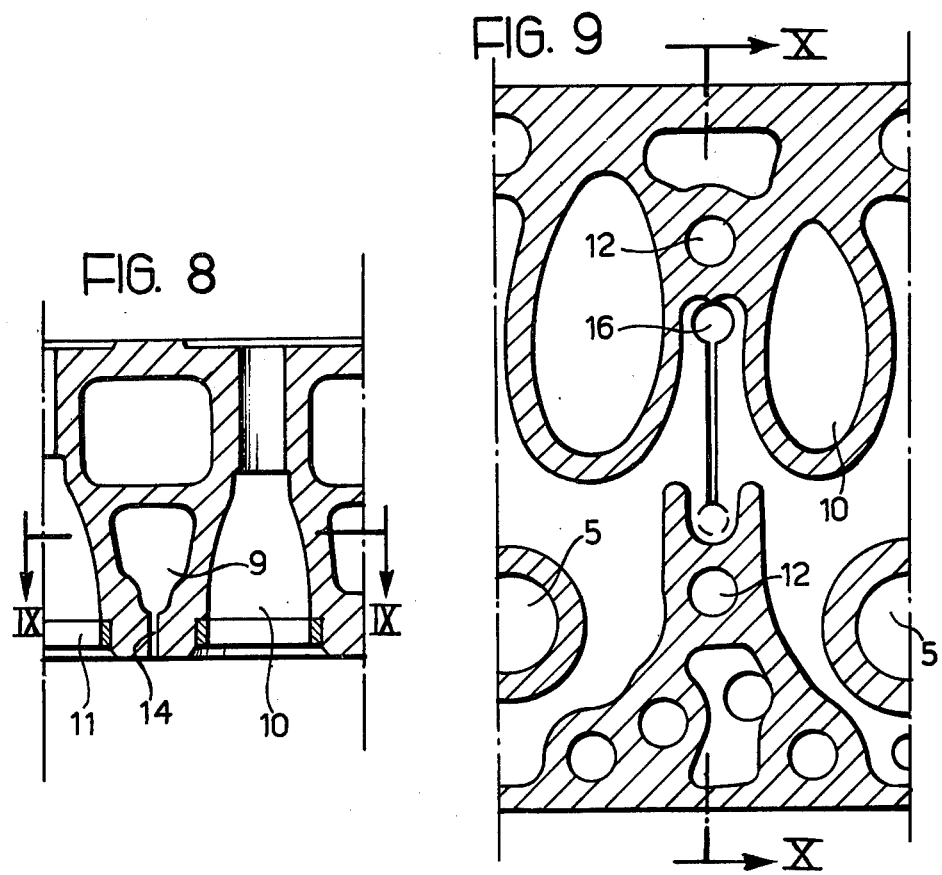
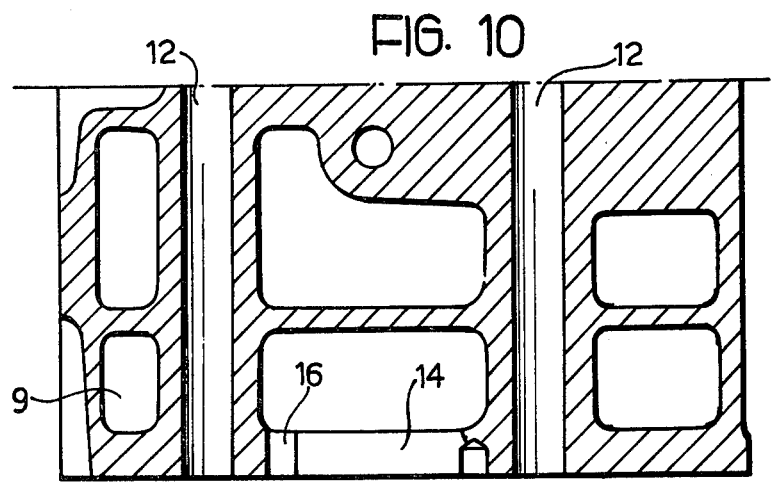

CYLINDER HEAD FOR COMPRESSION-IGNITION INTERNAL COMBUSTION ENGINE

The present invention relates to cylinder heads for compression-ignition internal combustion engines of the type having precombustion chambers associated with the engine cylinders. In particular the invention relates to cylinder heads of the type constituted by a block formed to define a cooling chamber and a plurality of cavities providing for each of the cylinders of the engine, a precombustion chamber, induction and discharge ducts, and a seat for a fuel injector, the cooling chamber being traversable by liquid coolant to cool the walls which delimit the said cavities. In cylinder heads of this type, the said cooling chamber is delimited in part by a base wall the outer surface of which faces the cylinders of the engine when the cylinder head is assembled on the cylinder block of the engine.

Cylinder heads of the type specified above are often used for diesel engines intended to be installed in motor cars or other lightweight vehicles. Generally aluminium is used as the material for the cylinder head which makes it possible to obtain the characteristic of lightness which is indispensable in the case of an application of this type.

However, although a cylinder head made of aluminium allows particular advantages to be obtained from the point of view of lightness, the use of aluminium can give rise to problems as far as the reliability of the engine is concerned due to the difference between the coefficient of thermal expansion of aluminium and that of cast iron from which the cylinder block of the engine is generally made. In particular the said base wall of the cylinder head which separates the coolant chamber from the engine cylinders themselves, is subjected to thermal expansions well above the adjacent portions of the cylinder block (the coefficient of thermal expansion of the cast iron being about half that of aluminium). Stresses of thermal origin are particularly significant in the case of fast running diesel engines which are normally used for lightweight vehicles. The adverse effects that these stresses can have on the reliability of the engine are most serious for supercharged engines. In fact, for such engines the values of the maximum combustion pressure and of the thermal loads which occur during the operation of the engine can be as much as 30-50 percent greater than the corresponding values which occur in the case of a similar engine of the inducted type.

Since, during the running of an engine, the said base wall of the cylinder head is heated in a non-uniform manner (the regions which face into the cylinders of the engine are more heated than elsewhere), and since, as already stated, aluminium expands more than cast iron, deformations in the plane containing the said base wall can occur, which can give rise to high mechanical stresses in the regions between the bolts fixing the cylinder head onto the cylinder block of the engine. This can cause cracking and may also adversely affect the sealing provided by the gasket normally interposed between the cylinder head and the cylinder block of the engine.

It is an object of the present invention to provide a form of cylinder head which allows the above cited disadvantages to be alleviated.

This object is achieved, in accordance with the present invention by the provision of a cylinder head of the type initially specified, in which the said base wall is interrupted in each of its regions intermediate portions of the head corresponding to cylinders of the engine by a slit extending from the said outer surface of the said base wall in a plane perpendicular to the longitudinal direction of the cylinder head whereby the portions of the cylinder head corresponding to different cylinders are partially separated from one another.

The space delimited by each slit allows the free expansion of the portions of the base wall which are adjacent to this slit thereby alleviating thermally induced stresses in the cylinder head.

An aluminium cylinder head embodying the invention will now be described, by way of example, with reference to the accompanying diagrammatic drawings, in which:

FIG. 5 is a sectional view similar to FIG. 2 but showing a first variant of the cylinder head;

FIG. 6 is a section on line VI—VI of FIG. 5;

FIG. 7 is a sectional view similar to FIG. 6 but showing a second variant of the cylinder head;

FIG. 8 is a sectional view similar to FIG. 2 but showing a third variant of the cylinder head;

FIG. 9 is a section on line IX—IX of FIG. 8; and

FIG. 10 is a section on line X—X of FIG. 9.

Figure 1:
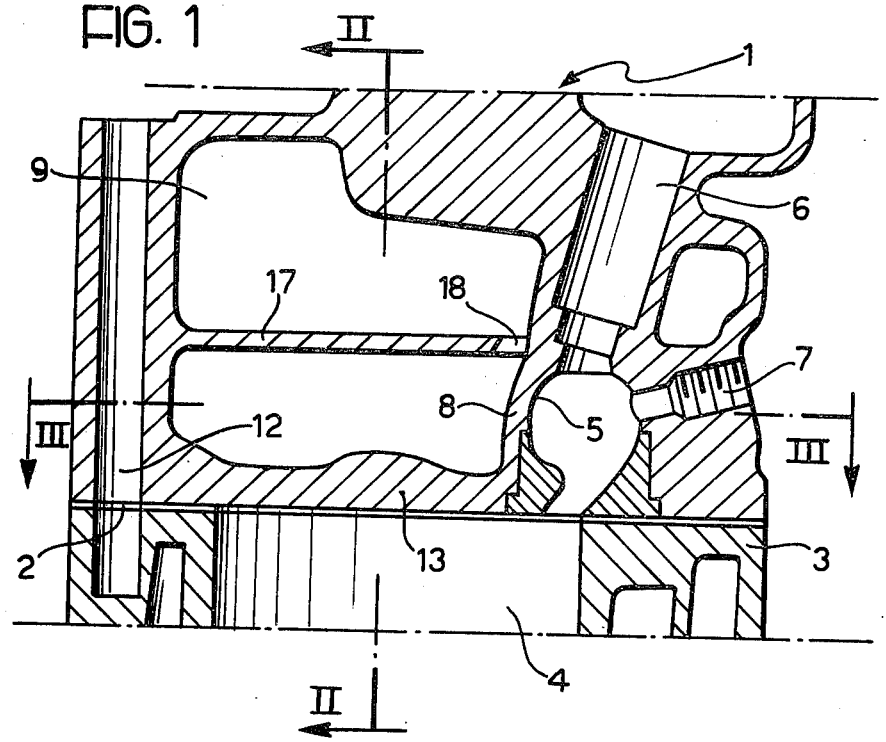
FIG. 1 is a transverse section of the cylinder head mounted on an engine cylinder block of which only part is shown, the section being taken in a plane containing the axis of one of the cylinders of the cylinder block.
Figure 2:
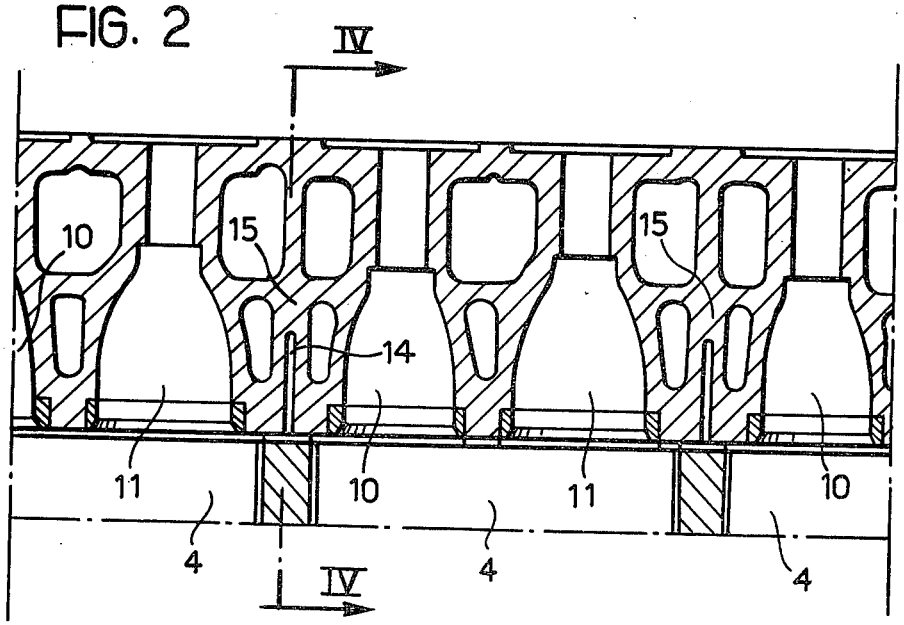
FIG. 2 is a section on line II—II of FIG. 1.

As shown in FIGS. 1 and 2, the aluminium cylinder head 1 now to be described is for mounting on a cast iron cylinder block 3 of a diesel engine with the interposition of a gasket 2. The cylinder head is secured to the cylinder block 3 by bolts (not shown) which extend through holes 12 in the cylinder head 1. The cylinder block 3 is formed with cylinders 4.

Within the block of aluminium constituting the cylinder head 1 are formed cavitites 5 constituting precombustion chambers associated with the cylinders 4 of the engine. In the example illustrated, these precombustion chambers 5 are of the vortex type. Each precombustion chamber 5 communicates at its upper end with a cavity 6 which is arranged to seat a fuel injector. Each precombustion chamber 5 also communicates with a threaded hole 7 intended to receive a glow plug for the pre-heating of fuel in the precombustion chamber 5. Each precombustion chamber 5 and its associated cavity 6 are delimited by an annular wall 8 the outer surface of which faces into a cooling chamber 9 through which coolant liquid is arranged to pass during working of the engine. Also facing into the cooling chamber 9 are the walls which delimit induction and exhaust ducts 10, 11 associated with each cylinder 4 and formed in the cylinder head 1.

The cooling chamber 9 is bounded at the bottom by a base wall 13 the outer surface of which faces into the cylinders 4 when the cylinder head 1 is mounted on the cylinder block 3. During operation of the engine, the wall 13 is subjected to heating in a non-uniform manner. Since aluminium has a coefficient of thermal expansion approximately equal to twice the coefficient of thermal expansion of cast iron, this non-uniformity of heating can give rise to permanent deformations of the head 1 in the regions lying between the bolts fixing the cylinder head 1 onto the cylinder block 3. To prevent this from happening, the base wall 13 is interrupted, in each of its regions intermediate portions of the head 1 corresponding to adjacent cylinders 4, by a slit 14 (see FIGS. 2 to 4) which extends in a plane perpendicular to the longitudinal direction of the cylinder head 1. In the case of the embodiment illustrated in FIGS. 2 to 4, each slit 14 extends perpendicular to the longitudinal direction of the cylinder head 1 across the whole width of the cylinder head 1 (see FIG. 3). The different portions of the cylinder head 1 corresponding to the cylinders 4 of the engine are therefore separated from one another in the lower part of the cylinder head 1. The spaces defined by the slits 14 allow a free expansion of the adjacent aluminium portions of the head 1 during the operation of the engine, thus avoiding the creation of stresses in the cylinder head 1 as a result of expansions caused by the high temperatures which are reduced during the operation of the engine.

Each of the slits 14 is preferably formed by means of a milling operation.

Figure 3:
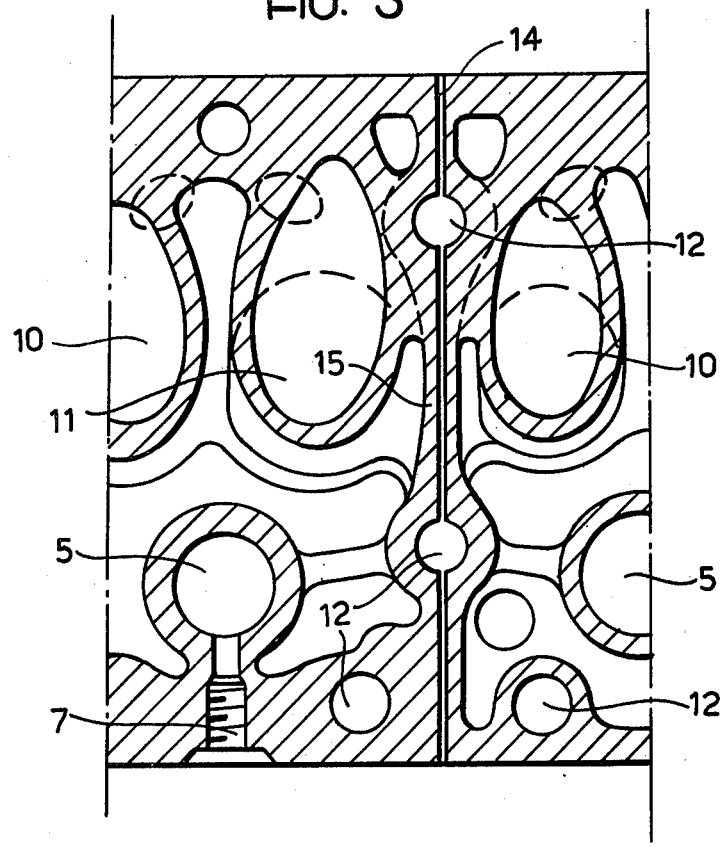
FIG. 3 is a section on line III—III of FIG. 1.
Figure 4:
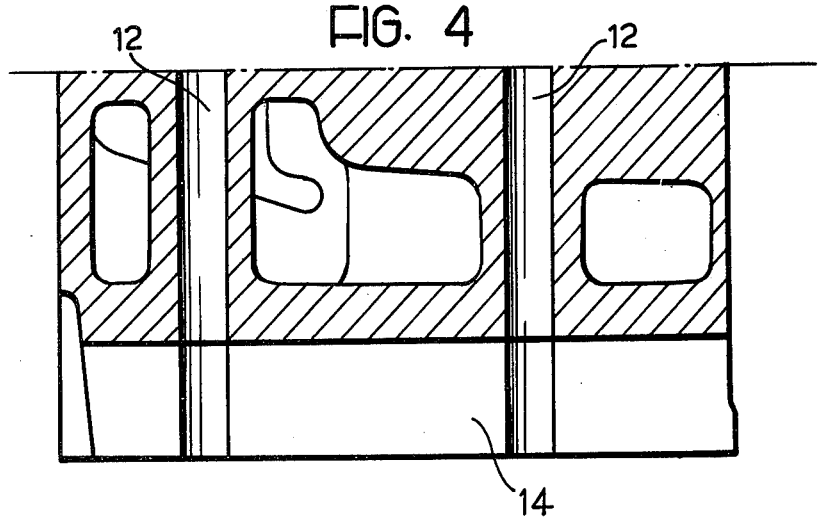
FIG. 4 is a section on line IV—IV of FIG. 2.

As shown in FIGS. 2 to 4, vertical walls 15 are disposed in the cooling chamber 9, in correspondence with the slits 14. Each wall 15 lies in the plane of its associated slit 14 and has a thickness which allows that slit 14 to have a height greater than the thickness of the base wall 13, without thereby extending into the cooling chamber 9.

FIGS. 5 and 6 show a variant of the cylinder head 1 in which the height of each slit 14 is less than the thickness of the base wall 13.

In the case of the two further variants of the cylinder head 1 illustrated in FIG. 7, and in FIGS. 8 to 10 respectively, each slit 14 extends perpendicular to the longitudinal direction of the cylinder head 1 for a distance less than the width of the cylinder head. Moreover, in the cylinder head variant illustrated in FIGS. 8 to 10, the vertical walls 15 are omitted and the space defined by each slit 14 is in communication with the cooling chamber 9. The cooling action due to the coolant liquid circulating in the cooling chamber 9 is thus extended to the walls which delimit each slit 14. Also shown in FIGS. 9 and 10, is a duct 16 formed in the base wall 13, which serves to communicate the cooling chamber 9 with the cooling jacket formed in the cylinder block 3 of the engine.

All the forms of the cylinder head 1 illustrated in the drawings have a further common characteristic. Within the cooling chamber 9 there is, in fact, disposed a dividing wall 17 (see FIG. 1) which lies in a plane perpendicular to the axes of the cylinders 4 and which divides the chamber 9 into a lower part adjacent the base wall 13 and the precombustion chambers 5, and an upper part adjacent to the cavities 6. In correspondence with each precombustion chamber 5, the wall 17 is provided with an opening 18 inter-communicating the upper and lower parts of the cooling chamber 9. As a result, the cooling liquid, which is supplied to the lower part of the chamber 9, is prevented from immediately dispersing throughout the cooling chamber 9 and remains for a longer time in the lower part of the chamber 9 where it flows over the outer surface of the walls defining each precombustion chamber 5. This arrangement has the advantage of improving cooling of the cylinder head 1 at the wall which delimits each precombustion chamber 5 and at the base wall 13. Furthermore, the presence of the dividing wall 17 increases the moment of inertia of the transverse section of the cylinder head 1, which allows the base wall 13 to be produced with a smaller thickness. In this way it is possible to effect a more efficacious cooling of the base wall 13 thus improving the working environment for this wall from the point of view of thermal conditions and of the resultant stresses generated by expansion of the head 1.

It will be appreciated that although the example illustrated refers to a cylinder head of aluminium (since for such heads the advantages resulting from the provision of the slits 14 are most relevant), it is possible to provide cylinder heads made of other materials, such as cast iron, with the head slits 14 for the partial separation of the portions of the cylinder head corresponding to the cylinders of the engine.

We claim:

1. A cylinder head for a compression-ignition internal combustion engine of the type having precombustion chambers associated with the engine cylinders, the head being constituted by an elongate block formed to define walls delimiting both a cooling chamber and a plurality of cavities the latter of which provide for each of said engine cylinders, a precombustion chamber, induction and discharge ducts, and a seat for a fuel injector, said cooling chamber being traversable by coolant liquid to cool said walls which delimit the said cavities, and one said wall delimiting said cooling chamber constituting a base wall the outer surface of which faces into the cylinders of the engine when the cylinder head is assembled onto the engine cylinder block, the said base wall being integral with said head and formed, intermediate portions of the head corresponding to said engine cylinders, with means to allow expansion comprising slits having a uniform thickness extending into said cylinder head from the said outer surface of the said base wall in a plane perpendicular to the longitudinal direction of the cylinder head across the whole width thereof adjacently spaced from said cooling chamber whereby the portions of the cylinder head corresponding to different cylinders are partially separated from one another.

2. A cylinder head according to claim 1, wherein the said slits are formed by milling.

3. A cylinder head according to claim 1, in which each of the cavities constituting the seats for the fuel injectors is disposed above the cavity constituting the corresponding precombustion chamber and is delimited jointly therewith by a said wall the outer surface of which faces into the cooling chamber, the interior of the said cooling chamber being separated by a dividing wall into a first part adjacent each precombustion chamber, and a second part adjacent each fuel injector seat, and said dividing wall defining an adjacent each precombustion chamber an opening which serves to intercommunicate the first and second parts of the said cooling chamber.

4. A cylinder head according to claim 1, wherein the head is formed from a block of aluminium.

5. A cylinder head according to claim 1, wherein in correspondence with each of the said slits, a vertical dividing wall is disposed within the cooling chamber in the plane of the slit.

6. A cylinder head according to claim 5, wherein each slit extends for a height greater than the thickness of the said base wall to project into the thickness of the vertical dividing wall, said dividing wall serving to isolate the space delimited by the slit from the cooling chamber.

* * * * *